United States Patent [19]

Faul, Jr.

[11] Patent Number: 4,589,250
[45] Date of Patent: May 20, 1986

[54] SUNFLOWER HEADER ATTACHMENT FOR COMBINE

[75] Inventor: Albert Faul, Jr., Harvey, N. Dak.

[73] Assignee: Faul Manufacturing, Inc., Harvey, N. Dak.

[21] Appl. No.: 678,169

[22] Filed: Dec. 4, 1984

[51] Int. Cl.[4] ............................................. A01D 45/30
[52] U.S. Cl. ..................................... 56/126; 56/14.4; 56/15.6; 56/119
[58] Field of Search .................. 56/98, 119, 126, 127, 56/128, 129, 130, 228, 15.6, 14.4

[56] References Cited

U.S. PATENT DOCUMENTS

| | | | |
|---|---|---|---|
| 2,867,961 | 1/1959 | Heilbrun | 56/119 |
| 3,812,661 | 5/1974 | Baker | 56/128 |
| 3,995,413 | 12/1976 | Lynch | 56/119 |
| 4,435,946 | 3/1984 | Erickson | 56/15.6 |

Primary Examiner—Gene Mancene
Assistant Examiner—David I. Tarnoff
Attorney, Agent, or Firm—Douglas L. Tschida

[57] ABSTRACT

Apparatus detachably mounting to the header platform of a combine in aligned relation to the sickle bar assembly for converting over to sunflower harvesting. The assembly comprises a plurality of sunflower pans attached in spaced apart, slightly elevated relation to a tubular support member that mounts to the header platform via a plurality of chainbuckle and stop members. Assembly requires only the aligning of the attachment to the header platform and the tightening of the turn buckles.

5 Claims, 5 Drawing Figures

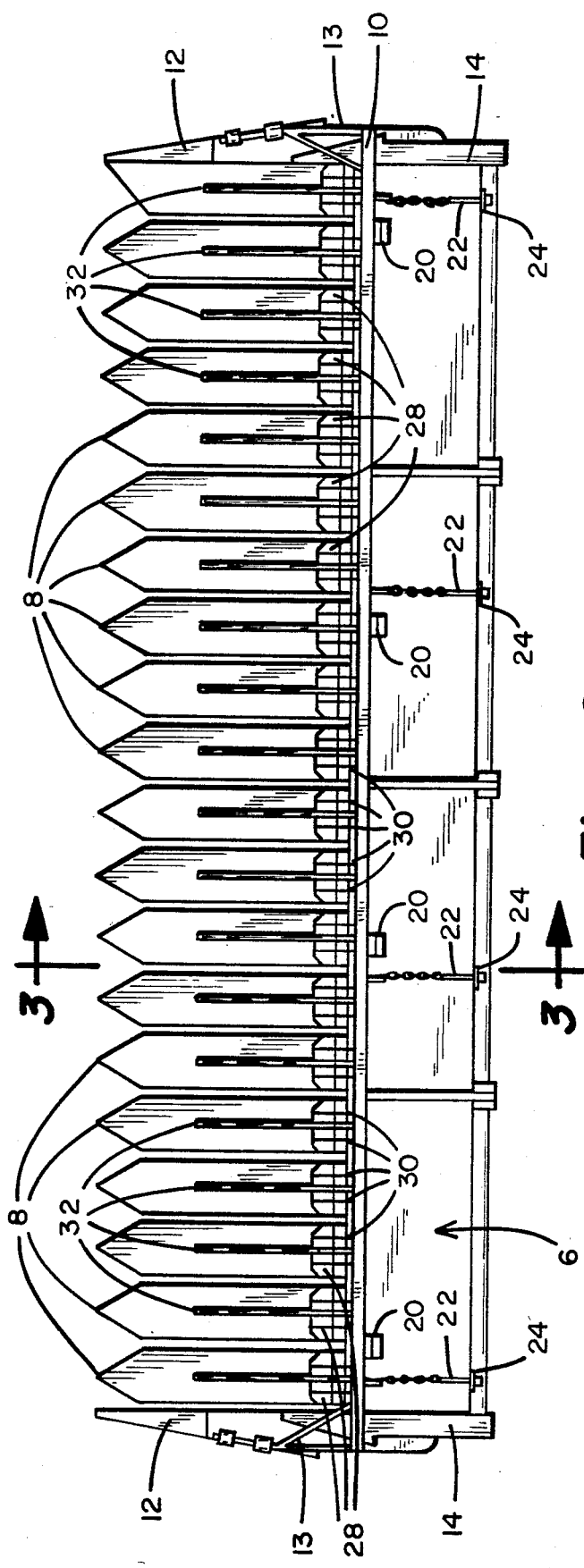
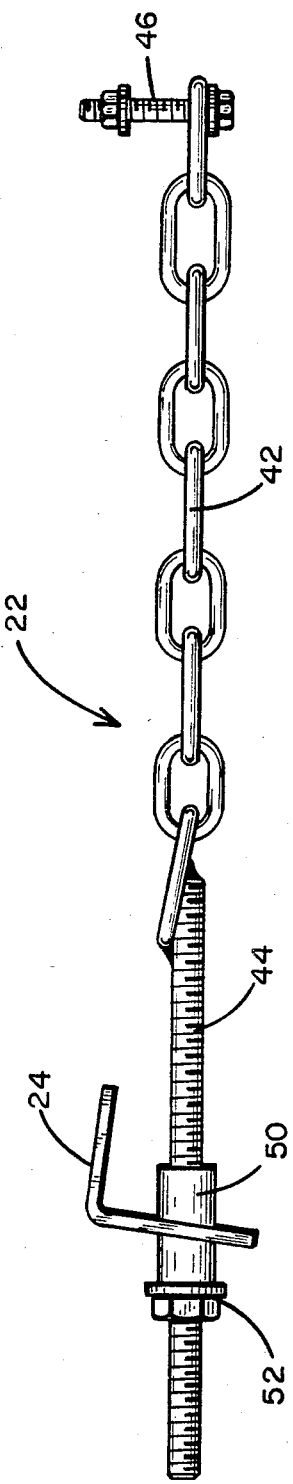
Fig. 2
Fig. 5

SUNFLOWER HEADER ATTACHMENT FOR COMBINE

BACKGROUND OF THE INVENTION

The present invention relates to sunflower harvesting apparatus and, in particular to a modular preassembled, detachable assembly that mounts to a combine header platform when converting over to sunflower harvesting.

Of the numerous problems facing the farm operator of today, one problem that arises in the growing and harvesting of sunflowers in the excessive amount of time that is required to convert most combines over to accomodate the attendant harvesting. Specifically and depending upon the width of the combine itself, it is often necessary for the operator to individually attach upwards of 27 sunflower pans across the width of the header platform, before adjusting each in relation to the sickle bar assembly. Because of the numbers of connections required to align and support each pan relative to the combine, this operation can take several hours to achieve, not to mention the lost time in sorting and organizing the associated parts and which invariably become misplaced between each year's harvesting season.

Examples of apparatus of the above-mentioned type can be seen upon directing attention to U.S. Pat. Nos. 4,255,920 and 3,844,094. In each of these patents, individual assemblies are shown for converting a combine over to sunflower harvesting, but with each of which it is necessary to individually attach each sunflower pan and its associated supports to the sickle bar and/or header platform. These operations again taking a great deal of time.

In order to overcome the above problems and minimize the change-over time, the present invention provides for a modular, preassembled, detachable assembly that eliminates the necessity of individually mounting and unmounting the pans. Instead, it provides for a unitary assembly that merely requires the slip fitting thereof to the combine's header platform and the tightening of a number of turnbuckle-like members. Specifically, it comprises a tubular member to which a number of pan support platforms and pans are attached, along with oppositely mounted side divider boards. To mount the attachment, it is only necessary for the operator to drive forward and engage the attachment and align it with a number of alignment guides mounted to the bottom of the header platform. Next, a number of chain buckle assemblies are attached to the header platform and tightened so as to restrain the attachment to the header platform. The change-over operation is thus accomplished in a matter of minutes.

The above objects, advantages and distinctions of the present invention, as well as the details of its construction, will, however, become more apparent upon reference to the following description thereof with respect to the appended drawings. Before referring thereto, it is to be recognized that the following description is made with respect to the presently preferred embodiment only and that, accordingly, various modifications may be made thereto by those of skill in the art without departing from the spirit and scope thereof.

SUMMARY OF THE INVENTION

A modularly constructed unitary assembly for attachment to the header platform of a combine to permit the harvesting of sunflowers. The attachment slip fits over the snout of the header platform relative to the sickle bar and is attached thereto via a number of turnbuckle-like "chain buckle" assemblies secured beneath the header platform.

In combination, the assembly comprises a lengthwise tubular member and to which a plurality of sunflower pan supporting platforms are mounted, along with attendant pan supports. A plurality of "chain buckles" attached to the tubular member secure the assembly to the combine header platform. A plurality of alignment stops mounted to the bottom of the header platform assure proper alignment. Lateral sideboards at each end of the tubular member further facilitate the mounting over the sideboards of the combine header platform.

BRIEF DESCRIPTION OF THE DRAWINGS

FIG. 2 shows a bottom view of the present header attachment in mounted relation to the header platform.

FIG. 5 shows a view of one of the chain buckle tighteners and its associated header platform clamp.

DESCRIPTION OF THE PREFERRED EMBODIMENT

Figure 1:
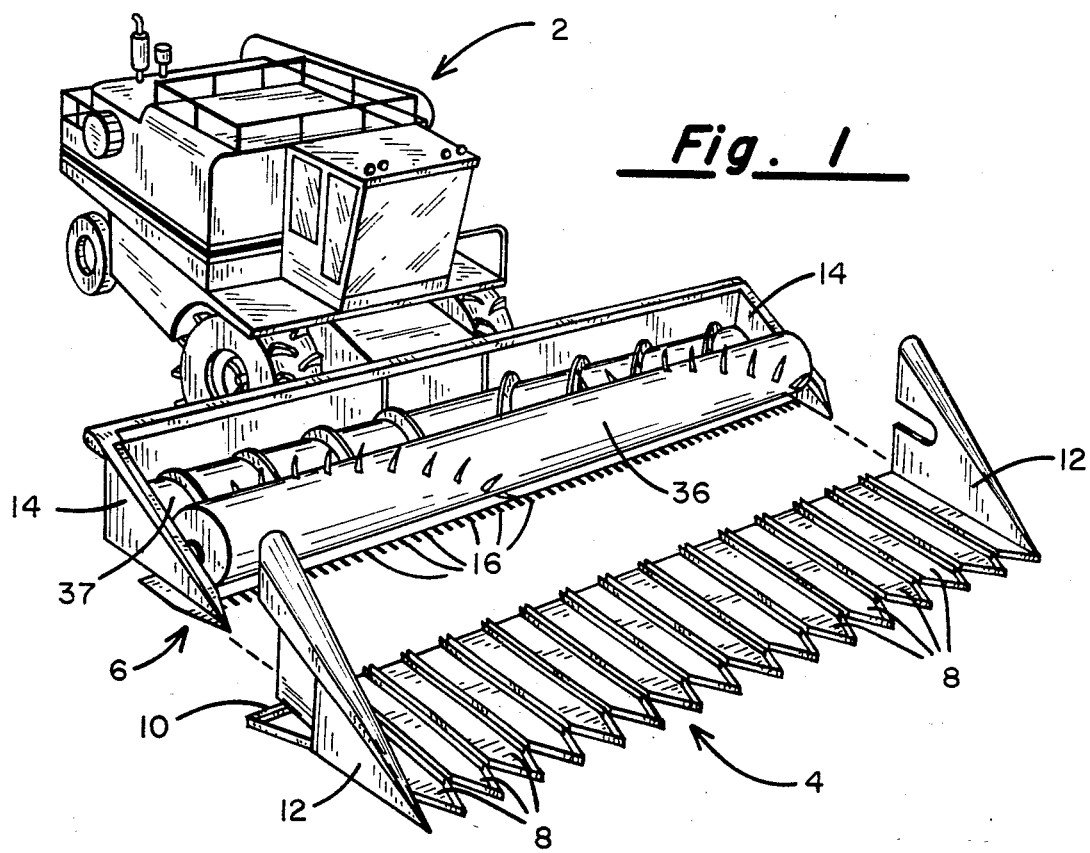
FIG. 1 shows a perspective view of a typical combine in relation to the present sunflower header attachment.

Referring to FIG. 1, a perspective view is shown of a typical combine 2 relative to the present sunflower header attachment 4 and which is mountable to the header platform 6 of the combine 2 to convert it over to permit the harvesting of sunflowers. The present apparatus particularly facilitates the conversion process by minimizing the amount of the time necessary to convert over.

It comprises a unitary structure that contains a sufficient number of sunflower pans 8 to accomodate the width of the combine's header platform 6. Each of the pans 8 is coupled to a tubular member 10 that mounts beneath the header platform 6 and to the right and left sides of which tubular member 10 are mounted side divider boards 12.

The mounting of the header attachment 4 to the combine 2 is accomplished by driving the combine 2 forward with its header platform 6 raised slightly until its sideboards 14 are captured beneath the attachment 4's sideboards 12. Upon next raising the header platform 6, the header attachment 4 can be manually jogged, as necessary, to align the tubular member 10 with a number of stops (not shown) permanently mounted to the bottom of the header platform 6. At this point, the combine's sickle bar 16 is thereby aligned relative to the pans 8. Once proper alignment is assured, a number of so-called "chain buckles" (not shown) are attached and tightened so as to secure the attachment 4 to the header platform 6. Further details of the header attachment 4, however, will be described hereinafter. Once, too, the attachment 4 is secured to the combine 2, the operator need do nother further other than to begin harvesting and which proceeds in the same fashion as before. The whole process also taking only a matter of minutes, rather than the hours previously required to separately attach each sunflower pan 8 to the sickle bar 16.

Directing attention now to FIGS. 2 to 5, the construction of the header attachment 4 will be discussed in detail. Referring first to FIG. 2, a bottom view is shown of the header attachment 4 in mounted relation to the header platform 6. From this view, a better understanding can be had to the slip-fit relation of the attachment 4 to the platform 6 as well as the construction of the attachment 4. In the latter regard, it is to be noted that the tubular member 10 extends across the full width of the platform 6 and is positioned relative to a number of alignment stops 20 that are weldably secured along the bottom of the platform 6. Upon adjusting the attachment 4 to bring the tubular member to bear against each of the stops, each of the chain buckle assemblies 22 are positioned so as to secure a clamp member 24 at the back of the platform 6, before adjusting the length of a threaded rod section and whereby the attachment 4 is secured to the platform 6.

As shown in the drawing, mounted above the tubular member 10 and extending forwardly and upwardly therefrom are a number of sunflower pan platforms 28 and which are secured to the tubular member 10 via pairs of angle cut brace members 30 that mount to the right and left sides thereof. Mounted between the braces 30, in turn, is a pan support member 32 that is boltably secured at the tubular member 10 to a small tab extending therefrom and to the bottom of the forward end of the pans 8. Thus, the pans 8 are rigidly supported in relation to the tubular member 10 and the spacings between which are adjusted to accomodate the row crop spacings and thereby facilitate harvesting. Also, to be seen is the support bracing 13 that couples the right and left divider boards 12 to the ends of the tubular member 10.

Figure 3:
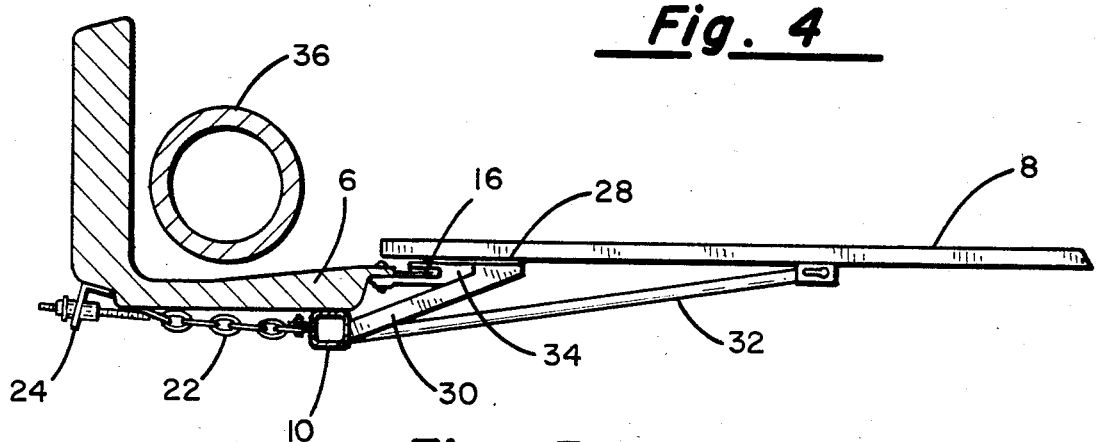
FIG. 3 shows a cross-sectioned side view, taken along section lines 3—3 of FIG. 2, through the header platform and the mounting relation of the header attachment relative to the sickle bar and header platform.

Referring also to FIG. 3, a cross-section side view taken along section lines 3—3 of FIG. 2 is shown and wherein more of the details of the attachment 4 and its mounting relation to the platform 6 can be seen. Specifically, it is to be noted that the brace members 30 angle from the tubular member 10 such that the pin platforms 28 are positioned just forward and slightly above the sickle bar assembly 16 and the guard members 34 secured therealong. In this fashion, each sunflower pan 8 is mounted so that it does not interfere with the operation of the sickle bar assembly 16 nor obstruct the movement of the sunflowers as they are brought to bear against the reciprocating knives before the heads are cut from the sunflowers and collected in the pans 8 as they are conveyed rearwardly to the tubular rotating rake 36 and feed auger 37.

Figure 4:
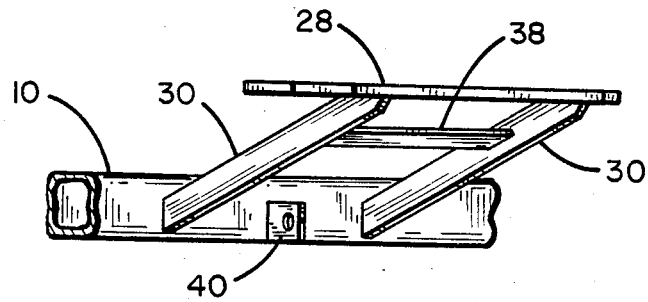
FIG. 4 shows a breakaway perspective view of an individual sunflower pan platform.

With further attention directed to FIG. 4, a breakaway view is shown of one of the pan mounting platforms 28 and its associated braces 30. From FIG. 4, it is to be noted that each of the platforms 28 comprises a square plate of approximately four inches on a side that is secured to the tops of the appropriately cut braces 30. A further cross brace 38 is also positioned between the side braces 30 to add additional lateral support. Each of these members 28, 30 and 38 are weldably secured to one another in the manner shown. Mounted to the tubular member 10 and midway between the braces 30 is a drilled tab member 40 that projects from the tubular member 10 and, as mentioned, is used to boltably secure one end of the pan support member 32, see FIG. 3.

Directing attention next to FIG. 5, a detailed side view is shown of one of the chain buckles 22. Specifically, each chain buckle assembly 22 comprises a length of chain 42 that is weldably secured at one end to a length of threaded rod 44 and at its opposite ends to the tubular member 10 via bolts and washers 46. The clamping member 24, in turn, comprises a piece of angle iron 48 and through one side of which is weldably secured a tubular sleeve 50 at a slight angle. The tubular sleeve 50 slidably mounts over the threaded rod 44 and is length adjusted relative thereto via the nut and washer 52 mounted behind the clamp element 24. Upon positioning the clamp 24 behind the header platform 6 in slots formed therein, in the fashion shown in FIG. 3, the nut 52 is adjusted so as to bring the clamp element 24 to bear against the header platform 6. Upon securing each of the chain buckles 22, the header attachment 4 is thus secured and ready for harvesting.

From the foregoing description, it should be apparent that the present header attachment 4 provides a number of unique advantages to a farm operator. Principally, it reduces the conversion time necessary to convert a combine 2 over to sunflower harvesting. Also, it minimizes the likelihood of the loosening the piece parts. Further, it is adaptable to accomodate most models of presently available combines and because it can be purchased with or without sunflower pans 8 and side dividers 12, a form operator can utilize his previously purchased corresponding piece parts. In this latter regard, it is to be noted that depending upon the actual width of the combine and the row crop spacing, one or more of the sunflower pans 32 may be added or deleted as necessary. Still further, if the farm operator acquires successively larger combines over time, the apparatus can be modified by appropriately lengthening the tubular member 10 and inserting additional braces 30 and 38, support platforms 28 and pans 8 as well as the chain buckles 22 and which piece parts are available from the present assignee, Faul Manufacturing, Inc., Harvey, N. Dak.

From the foregoing, it is to be recognized that the present invention has been described with respect to its presently preferred embodiment only and that accordingly various modifications may be suggested to those of skill in the art upon exposure thereto. Consequently, it is contemplated that the following claims should be interpreted so as to include any equivalent embodiments that would fall within the spirit and scope thereof.

What is claimed is:

1. Apparatus for converting a combine over to the harvesting of sunflowers, comprising in combination:
    (a) an elongated rigid frame member detachably mountable to the bottom of a combine header platform;
    (b) a plurality of sunflower pan support platforms attached in spaced apart relation to one another along said frame member, wherein each sunflower pan support platform is supported by a pair of brace members upwardly radiating from said frame member and having at least one cross brace therebetween to the bottom of said platform, and wherein each of said sunflower pan support platforms is mounted to said frame member so as to mount in overlying relation to a reciprocating knife assembly at the front-end of said combine;
    (c) a plurality of tab members, each attached to said frame member for securing one end of a brace member from a sunflower pan thereto; and (d) a plurality of draw fastener assemblies mounted in spaced-apart relation to one another along said frame member, each of said assemblies comprising;
  (1) a length of chain secured at one end to said frame member and secured at an opposite end to a threaded member,
  (2) a clamp slidably mounted along said threaded member and mountable in a mating recess at said header platform,
  (3) a plurality of stop members fixedly mounted to the bottom of said header platform, and
  (4) means cooperating with said threaded member for urging said clamp against said header platform and said frame member against said stop members, whereby said apparatus is detachably fixedly secured to the header platform of said combine.

2. Apparatus as set forth in claim 1 including a plair of divider boards mounted to said frame member, one at each opposed end thereof, each divider board having a generally right triangular vertical portion, the topmost edge of which tapers downwardly as it projects forwardly and which topmost edge includes an outwardly directed arcuated lip portion for mounting in overlying supporting relation with right and left combine sideboards, thereby securing the combine header platform between said divider boards and said frame member.

3. Apparatus as set forth in claim 1 including a plurality of sunflower pans, each pan secured to one of said support platforms and to said frame member by a brace member extending from a point rearward of the forwardmost bottom end and extending to one of said tab members.

4. Apparatus as set forth in claim 3 wherein each sunflower support pan includes an upwardly bent ridge formed on the peripheral horizontal edges thereof for preventing sunflower heads from falling from the support pans.

5. Apparatus for converting a combine over to the harvesting of sunflowers, comprising in combination:
  (a) a rigid tubular frame member detachably mountable to the bottom of a combine header platform;
  (b) a plurality of tab members attached along the length of said frame member:
  (c) a plurality of support platforms, each attached in spaced apart relation to one another along said frame member via a pair of brace members radiating upwardly from said frame member and at least one cross brace therebetween and mounted to said frame member so as to mount in overlying relation to a reciprocating knife assembly at the front-end of said combine;
  (d) a plurality of sunflower pans mounted to said plurality of support platforms, each having a ridge formed on its horizontal periphery for preventing sunflower heads from falling therefrom and each having a pan brace member attached at one end to one of said tab members and at an opposite end to the bottom of the sunflower pan at a point rearward of its foremost end;
  (d) a pair of divider boards mounted to said frame member, one at each opposed end thereof, each divider board having a generally right triangular vertical portion and a topmost edge of which tapers downwardly as it projects forwardly and which topmost edge includes an outwardly directed arcuate lip portion for mounting in overlying nesting relation to right and left combine sideboards;
  (e) a plurality of draw fastener assemblies mounted in spaced-apart relation to one another along said frame member each of said assemblies comprising;
    (1) a length of chain secured at one end to said frame member and at an opposite end to a threaded member,
    (2) a clamp slidably mounted along said threaded member and mountable in a mating recess at said header platform,
    (3) a plurality of stop members fixedly mounted to the bottom of said header platform, and
    (4) means cooperating with said threaded member for urging said clamp against said header platform and said frame member against said stop members, whereby said apparatus is detachably fixedly secured to the combine header platform.

* * * * *